US011340012B2

(12) United States Patent
Cardella et al.

(10) Patent No.: US 11,340,012 B2
(45) Date of Patent: May 24, 2022

(54) LOW-TEMPERATURE MIXED-REFRIGERANT FOR HYDROGEN PRECOOLING IN LARGE SCALE

(71) Applicant: LINDE AKTIENGESELLSCHAFT, Munich (DE)

(72) Inventors: Umberto Cardella, Baldham (DE); Lutz Decker, Winterthur (CH); Harald Klein, Wolfratscausen (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 223 days.

(21) Appl. No.: 15/771,154

(22) PCT Filed: Oct. 27, 2016

(86) PCT No.: PCT/EP2016/075914
§ 371 (c)(1),
(2) Date: Apr. 27, 2018

(87) PCT Pub. No.: WO2017/072221
PCT Pub. Date: May 4, 2017

(65) Prior Publication Data
US 2018/0320957 A1    Nov. 8, 2018

(30) Foreign Application Priority Data

Oct. 27, 2015  (EP) ..................... 15003069

(51) Int. Cl.
*F25J 1/00* (2006.01)
*C09K 5/04* (2006.01)
*F25J 1/02* (2006.01)

(52) U.S. Cl.
CPC .............. *F25J 1/001* (2013.01); *C09K 5/042* (2013.01); *F25J 1/005* (2013.01); *F25J 1/0042* (2013.01);

(Continued)

(58) Field of Classification Search
CPC .......... F25J 1/001; F25J 1/0022; F25J 1/0042; F25J 1/0055; F25J 1/0292; F25J 1/0259;
(Continued)

(56) References Cited

U.S. PATENT DOCUMENTS 4,033,735 A * 7/1977 Swenson ................ F25J 1/0052
62/612
4,404,008 A * 9/1983 Rentier .................. F25J 1/0022
62/612

(Continued)

FOREIGN PATENT DOCUMENTS

EP        1580506 A1    9/2005

OTHER PUBLICATIONS

International Search Report for PCT/EP2016/075914 dated Jan. 2, 2017.
(Continued)

*Primary Examiner* — Frantz F Jules
*Assistant Examiner* — Webeshet Mengesha
(74) *Attorney, Agent, or Firm* — Millen White Zelano & Branigan, PC; Brion P. Heaney

(57) ABSTRACT

The present invention relates to a refrigerant composition. According to the invention it is envisioned that the composition comprises comprising an inert gas selected from nitrogen, argon, neon and a mixture thereof, and a mixture of at least two $C_1$-$C_5$ hydrocarbons. The present invention further relates to the use of the refrigerant composition in a method for liquefying a gaseous substance, particularly hydrogen or helium.

16 Claims, 3 Drawing Sheets

(52) U.S. Cl.
CPC ........... *F25J 1/0052* (2013.01); *F25J 1/0055* (2013.01); *F25J 1/0062* (2013.01); *F25J 1/0065* (2013.01); *F25J 1/0067* (2013.01); *F25J 1/0072* (2013.01); *F25J 1/0092* (2013.01); *F25J 1/0095* (2013.01); *F25J 1/025* (2013.01); *F25J 1/0214* (2013.01); *F25J 1/0215* (2013.01); *F25J 1/0259* (2013.01); *F25J 1/0268* (2013.01); *F25J 1/0279* (2013.01); *F25J 1/0288* (2013.01); *F25J 1/0291* (2013.01); *F25J 1/0292* (2013.01); *F25J 1/0294* (2013.01); *C09K 2205/13* (2013.01); *C09K 2205/132* (2013.01); *F25J 2230/08* (2013.01); *F25J 2230/30* (2013.01); *F25J 2230/40* (2013.01); *F25J 2240/40* (2013.01); *F25J 2270/16* (2013.01); *F25J 2270/90* (2013.01)

(58) Field of Classification Search
CPC .. F25J 1/025; F25J 1/0075; F25J 1/042; F25J 1/0214; F25J 1/0092; F25J 1/0291; F25J 1/0294; F25J 1/0268; F25J 1/0095; F25J 1/0052; F25J 1/0067; F25J 1/0065; F25J 1/0279; F25J 1/0288; F25J 1/0062; F25J 1/005
See application file for complete search history.

(56) References Cited

U.S. PATENT DOCUMENTS

| | | | | |
|---|---|---|---|---|
| 4,901,533 A | * | 2/1990 | Fan | F25J 1/0022 62/614 |
| 5,337,572 A | * | 8/1994 | Longsworth | F25B 9/006 62/114 |
| 5,441,658 A | * | 8/1995 | Boyarsky | C09K 5/042 252/67 |
| 5,579,654 A | * | 12/1996 | Longsworth | F17C 13/006 165/201 |
| 7,559,213 B2 | | 7/2009 | Allam et al. | |
| 2005/0210914 A1 | * | 9/2005 | Allam | F25J 1/001 62/607 |
| 2007/0181848 A1 | * | 8/2007 | Gadhiraju | C09K 5/042 252/67 |
| 2008/0053145 A1 | * | 3/2008 | Gandhiraju | C09K 5/042 62/502 |
| 2010/0281915 A1 | * | 11/2010 | Roberts | F25J 1/0256 62/612 |
| 2011/0067439 A1 | * | 3/2011 | Bridgwood | F25J 1/0294 62/606 |
| 2013/0269386 A1 | * | 10/2013 | Brostow | F25J 1/0055 62/613 |
| 2015/0260451 A1 | * | 9/2015 | Haberberger | F25J 1/0212 62/611 |
| 2015/0308738 A1 | * | 10/2015 | Ott | F25J 3/0257 62/623 |
| 2016/0327335 A1 | * | 11/2016 | Brostow | F25J 1/0219 |

OTHER PUBLICATIONS

Berstad, D. O. et al., "Large-scale hydrogen liquefier utilising mixed-refrigerant pre-cooling," International Journal of Hydrogen Energy, 2010, vol. 35, pp. 4512-4523.

\* cited by examiner

LOW-TEMPERATURE MIXED-REFRIGERANT FOR HYDROGEN PRECOOLING IN LARGE SCALE

The present invention relates to improved refrigerant compositions and methods for liquefying gaseous streams, particularly gaseous streams consisting of or comprising hydrogen or helium.

The demand for liquid hydrogen production for e.g. clean energy applications is rapidly increasing. Thus, a significant upscaling of industrial hydrogen liquefiers is required to step up from the current largest state-of-the-art plants with a capacity in the range of 5 tpd to 10 tpd (upscaling factor 10 to 20). New large-scale hydrogen liquefaction plants with production capacities of, for instance, up to 150 tpd will require thermodynamically and economically efficient process designs. Specific energy consumption, and thus operational costs, has to be significantly reduced compared to state-of-the art plant and prior concepts, while limiting additional capital expenditures as well as utilizing process equipment and technology available today.

In current industrial hydrogen liquefiers, the hydrogen feed stream is precooled from ambient temperature to approximately 80 K by evaporating a liquid nitrogen stream at typically about 78 K. Liquid nitrogen is supplied, for example, from an onsite air separation unit, a nitrogen reliquefier or by liquid trailers. This plant design is economically effective for small to medium scale liquefiers. However, for higher liquefaction capacities, the liquid nitrogen stream supplied as a refrigerant will significantly increase the plant operating costs, thus reducing sharply the cost effectiveness of liquid hydrogen production.

In order to increase the energy-efficiency of the hydrogen feed precooling, closed loop refrigeration cycles can be designed for medium and large-scale liquefiers. Currently known conceptual designs for precooling cycles in hydrogen liquefiers show, however, deficiencies in either energy-efficiency, capital costs and/or process complexity e.g. rotating equipment count, refrigerant make-up system. Up to now, this has been a major limiting factor for upscaling hydrogen liquefaction plants from current maximum single train production rates.

Closed-loop nitrogen expander cycles as proposed in Ohlig et al. ("Hydrogen, 4. Liquefaction" Ullmanns's Encyclopedia of Industrial Chemistry, edited by F. Ullmann, Wiley-VCH Verlag, 2013) can reach precooling temperatures around or below 80 K, but are characterized by a relatively high number of additional rotating machines and a significantly lower thermodynamic efficiency compared to mixed-refrigerant cycles.

Currently, known mixed-refrigerant cycles, (U.S. Pat. No. 4,033,735, U.S. Pat. No. 5,657,643 and Bauer (StarLNG™: a Family of Small-to-Mid-Scale LNG Processes, Conference paper, 9th Annual Global LNG Tech Summit 2014: March 2014) for large industrial gas cooling processes, such as natural gas, can increase precooling efficiency but are designed for relatively high precooling temperatures, typically above 120 K, thus shifting the generation of the required cooling duty to the colder, more inefficient refrigeration cycle in a hydrogen liquefier. Additionally, prior conceptual designs for hydrogen liquefiers, such as in the IDEALHY study (2012, http://www.idealhy.eu), have proposed precooling refrigerant mixtures with a comparatively high number of fluid components (5 or more). In contrast to natural gas processing sites, these refrigerants have to be regularly imported to potential hydrogen liquefaction plant sites for inventory make-up and typically require additional storage vessels for each component, thus increasing operational complexity and handling.

Thus, it is the objective of the present invention to provide improved refrigerant compositions and a method for efficiently and economically liquefying gas streams, particularly suitable for large scales.

This objective is attained by the refrigerant composition according to claim 1 and the method according to claim 11.

According thereto, a refrigerant composition is provided, wherein the composition comprises an inert gas selected from nitrogen, argon, neon and a mixture thereof, and a mixture of at least two $C_1$-$C_5$ hydrocarbons. The refrigerant composition comprises four components, wherein a first component is nitrogen or nitrogen in a mixture with neon and/or argon, a second component is methane or argon, a third component is ethane or ethylene, and a fourth component is one of n-butane, isobutane, 1-butene, propane, propylene, n-pentane and isopentane.

The refrigerant composition of the invention is particularly useful for refrigerants that are designed to cool fluid streams from ambient temperature to lower temperatures in the range of 80 K to 125 K. This is achieved by pressurizing such refrigerants and expanding under cooling of the refrigerant, particularly to the above-mentioned temperature range, thereby producing cold. Particularly, such refrigerants may advantageously be used as precooling refrigerants in processes such as the liquefactions of gases such as hydrogen.

In certain embodiments, the refrigerant composition comprises an inert gas selected from nitrogen and nitrogen in a mixture with argon and/or neon, and further comprises a mixture of at least two $C_1$-$C_5$ hydrocarbons.

In certain embodiments, the $C_1$-$C_5$ hydrocarbon is selected from the group comprised of methane, ethane, ethylene, n-butane, isobutane, propane, propylene, n-pentane, isopentane and 1-butene.

In certain embodiments, the refrigerant composition comprises or consists of four components, wherein a first component is nitrogen, or nitrogen in a mixture with neon and/or argon, a second component is argon or methane, a third component is ethane or ethylene, and a fourth component is n-butane, isobutane, 1-butene, propane, propylene, n-pentane or isopentane.

In certain embodiments, the refrigerant composition comprises a fifth component, wherein the fifth component is argon, neon, n-butane, isobutane, 1-butene, propane, propylene, n-pentane or isopentane, provided that the fifth component is different from the fourth component or the second component, e.g. the fifth component can be n-butane, isobutane, propane, propylene or n-pentane if the fourth component is isopentane.

In certain embodiments, the refrigerant composition comprises a sixth component, wherein the sixth component is argon, neon, n-butane, isobutane, 1-butene, propane, propylene, n-pentane or isopentane, provided that the sixth component is different from the second component, the fourth component and fifth component, e.g. the sixth component can be isobutane, propane, propylene or n-pentane if the fourth component is isopentane and the fifth component is n-butane.

The refrigerant composition of the invention can be adapted depending on the designed precooling temperatures. Also, the refrigerant composition can be monitored and regulated by the plant make-up system in order to adapt the mixture composition to changing ambient and process conditions.

In certain embodiments, the first component is nitrogen, the second component is methane, the third component is ethane or ethylene, and the fourth component is isobutane, n-butane, isopentane or n-pentane. Such composition of the refrigerant of the invention is particularly useful if the cooling temperature to be achieved with the refrigerant is in the range 100 K and 120 K, and higher.

In certain embodiments, the third component is ethane. Such composition of the refrigerant of the invention is particularly useful if the intermediate temperature to be achieved in the precooling step is below or equal to approx. 100 K (±5 K). In certain embodiments, third component is ethylene. Such composition of the refrigerant of the invention is particularly useful if the cooling temperature to be achieved with the refrigerant is above approx. 100 K (±5 K).

In certain embodiments, the fourth component, and optionally the fifth component, is isobutane, 1-butene, propane, propylene or isopentane, provided that the fifth component is different from the fourth component. Such composition of the refrigerant of the invention is particularly useful if the cooling temperature to be achieved with the refrigerant is below approx. 100 K (±5 K).

In certain embodiments, the refrigerant composition comprises
nitrogen in the range of up to 25 mol. %, and,
methane in the range of up to 40 mol. %, and,
ethane or ethylene in the range of up to 45 mol. %, and
1-butene, n-butane, isobutane, n-pentane or isopentane in the range of up to 35 mol. %, or propane or propylene in the range of up to 45 mol. %,
provided that the sum of the above concentrations does not exceed 100 mol. %.

In certain embodiments, the refrigerant composition comprises
nitrogen in the range of 5 mol. % to 25 mol. %, and,
methane in the range of 20 mol. % to 40 mol. %, and,
ethane or ethylene in the range of 10 mol. % to 45 mol. %, and
1-butene, n-butane, isobutane, n-pentane or isopentane in the range of 10 mol. % to 35 mol. % or propane or propylene in the range of 10 mol. % to 45 mol. %,
provided that the sum of the above concentrations does not exceed 100 mol. %.

In certain embodiments,
the first component is nitrogen, particularly in the range of 5 mol. % to 25 mol. %, more particularly in the range 8 mol. % to 18 mol. %,
the second component is methane, particularly in the range of 20 mol. % to 40 mol. %, more particularly in the range 30 mol. % to 36 mol. %,
the third component is ethane or ethylene, particularly ethylene, particularly in the range of 20 mol. % to 45 mol. %, more particularly in the range 28 mol. % to 35 mol. %, and
the fourth component is n-butane, isobutane, propane, propylene, n-pentane or isopentane, particularly n-butane or n-pentane preferably:
n-butane or isobutane in the range 10 mol. % to 35 mol. %, more particularly in the range 22 mol. % to 28 mol. %, or
n-pentane or isopentane in the range 10 mol. % to 30 mol. %, more particularly 15 mol. % to 25 mol. %.

Such compositions of the refrigerant of the invention are particularly useful if the cooling temperature to be achieved with the refrigerant is between 100 K and 120 K, particularly between 100 K and 110 K.

In certain embodiments, the refrigerant composition consists of 11 mol. % nitrogen, 33 mol. % methane, 31 mol. % ethane and 25 mol. % n-butane. In certain embodiments, the refrigerant composition consists of 12 mol. % nitrogen, 32 mol. % methane, 31 mol. % ethane and 25 mol. % n-butane. In certain embodiments, the refrigerant composition consists of 14 mol. % nitrogen, 32 mol. % methane, 29 mol. % ethane and 25 mol. % isobutane. In certain embodiments, the refrigerant composition consists of 16 mol. % nitrogen, 31 mol. % methane, 27 mol. % ethane and 26 mol. % isobutane. In certain embodiments, the refrigerant composition consists of 10 mol. % nitrogen, 33 mol. % methane, 41 mol. % ethane and 16 mol. % pentane. In certain embodiments, the refrigerant composition consists of 11 mol. % nitrogen, 32 mol. % methane, 38 mol. % ethane and 19 mol. % isopentane. Such compositions of the refrigerant of the invention are particularly useful the cooling temperature to be achieved with the refrigerant is between 100 K and 120 K.

In certain embodiments,
the first component is nitrogen, particularly in the range 10 mol. % to 30 mol. %, more particularly in the range 15 mol. % to 25 mol. %,
the second component is methane, particularly in the range 20 mol. % to 40 mol. %, more particularly in the range 28 mol. % to 35 mol. %,
the third component is ethane or ethylene, particularly in the range of 10 mol. % to 40 mol. %, more particularly in the range 23 mol. % to 36 mol. %, and
the fourth component is isobutane, 1-butene, propane, propylene or isopentane, particularly isobutane or isopentane. preferably:
isobutane in the range 10 mol. % to 30 mol. %, more particularly in the range 21 mol. % to 28 mol. %, or
isopentane in the range 10 mol. % to 25 mol. %, more particularly in the range 15 mol. % to 22 mol. %, or
propane in the range 20 mol. % to 40 mol. %, more particularly 30 mol. % to 40 mol. %.

In certain embodiments,
the first component is nitrogen, in the range of up to 30 mol. %,
the second component is methane, in the range of up to 40 mol. %,
the third component is ethane or ethylene, in the range of up to 40 mol., and
the fourth component is isobutane, 1-butene, propane, propylene or isopentane, particularly isobutane or isopentane. preferably:
isobutane in the range of up to 30 mol. %, or
isopentane in the range of up 25 mol. %, or
propane in the range of up to 40 mol.

Such compositions of the refrigerant of the invention are particularly useful if the cooling temperature to be achieved with the refrigerant is between 90 K and 100 K In certain embodiments, the refrigerant composition consists of 22 mol. % nitrogen, 30 mol. % methane, 24 mol. % ethane and 24 mol. % isobutane. In certain embodiments, the refrigerant composition consists of 17 mol. % nitrogen, 33 mol. % methane, 24 mol. % ethane and 26 mol. % isobutane. In certain embodiments, the refrigerant composition consists of 18 mol. % nitrogen, 29 mol. % methane, 36 mol. % ethane and 17 mol. % isopentane. In certain embodiments, the refrigerant composition consists of 18 mol. % nitrogen, 27 mol. % methane, 37 mol. % ethane and 18 mol. % isopentane. In certain embodiments, the refrigerant composition consists of 23 mol. % nitrogen, 30 mol. % methane, 12 mol. % ethane and 35 mol. % propane. Such compositions of the refrigerant of the invention are particularly useful if the cooling temperature to be achieved with the refrigerant is between 90 K and 100 K.

In certain embodiments, the refrigerant composition comprises
nitrogen, in the range of up to 35 mol. %, and,
argon, in the range of up to 40 mol. %, and,
ethane or ethylene, in the range of up to 40 mol. %, and,
isobutane, isopentane or 1-butene in the range of up to 35 mol. %, or propane or propylene in the range of up to 45 mol. %,
provided that the sum of the above concentrations does not exceed 100 mol. %.

In certain embodiments, the refrigerant composition comprises
nitrogen, particularly in the range of 5 mol. % to 35 mol. %, and,
argon, particularly in the range of 20 mol. % to 40 mol. %, and,
ethane or ethylene, particularly in the range of 10 mol. % to 40 mol. %, and,
isobutane, isopentane or 1-butene (preferably in the range of 10 mol. % to 35 mol. %), or propane or propylene (preferably in the range of 10 mol. % to 45 mol. %),
provided that the sum of the above concentrations does not exceed 100 mol. %.

In certain embodiments,
the first component is nitrogen, particularly in the range 5 mol. % to 25 mol. %, more particularly in the range 10 mol. % to 15 mol. %,
the second component is argon, particularly in the range 20 mol. % to 40 mol. %, more particularly in the range 30 mol. % to 40 mol. %,
the third component is ethane or ethylene, particularly in the range 20 mol. % to 40 mol. %, more particularly in the range 30 mol. % to 40 mol. %, and
the fourth component is isobutane or isopentane, particularly in the range 10 mol. % to 30 mol. %, more particular in the range 15 mol. % to 25 mol. %.

Such compositions of the refrigerant of the invention are particularly useful if the cooling temperature to be achieved with the refrigerant is between 90 K and 100 K.

In certain embodiments,
the first component is nitrogen, particularly in the range 10 mol. % to 35 mol. %, more particularly in the range 18 mol. % to 25 mol. %,
the second component is methane, particularly in the range 20 mol. % to 40 mol. %, more particularly in the range 28 mol. % to 34 mol. %,
the third component is ethane, particularly in the range 5 mol. % to 35 mol. %, more particularly in the range 20 mol. % to 27 mol. %, and
the fourth component is 1-butene, propane or propylene, particularly
1-butene in the range 10 mol. % to 35 mol. %, more particularly in the range 20 mol. % to 28 mol. %, or
propane in the range 10 mol % to 45 mol. %, more particularly 30 mol. % to 40 mol. %.

Such compositions of the precooling refrigerant are particularly useful if the cooling temperature to be achieved with the refrigerant is between 85 K and 90 K.

In certain embodiments, the refrigerant composition consists of 20 mol. % nitrogen, 30 mol. % methane, 26 mol. % ethane and 24 mol. % 1-butene. In certain embodiments, the refrigerant composition consists of 20 mol. % nitrogen, 30 mol. % methane, 24 mol % ethane and 26 mol. % 1-butene. In certain embodiments, the refrigerant composition consists of 22 mol. % nitrogen, 29 mol. % methane, 11 mol. % ethane and 38 mol. % propane. Such compositions of the refrigerant of the invention are particularly useful if the cooling temperature to be achieved with the refrigerant is between 80 K and 90 K.

In certain embodiments,
the first component is nitrogen, particularly in the range 10 mol. % to 35 mol. %, more particularly in the range 10 mol. % to 20 mol. %,
the second component is argon, particularly in the range of 20 mol. % to 40 mol. %, more particularly in the range of 30 mol. % to 40 mol. %,
the third component is ethane, particularly in the range 5 mol. % to 35 mol. %, more particularly in the range 20 mol. % to 27 mol. %, and
the fourth component is 1-butene, propane or propylene, particularly
1-butene in the range 10 mol. % to 35 mol. %, particularly in the range 20 mol. % to 28 mol. %, or
propane in the range 10 mol. % to 45 mol. %.

Such compositions of the refrigerant of the invention are particularly useful if the cooling temperature to be achieved with the refrigerant is between 80 K and 90 K.

In certain embodiments, the refrigerant composition consists of 12.5 mol. % nitrogen, 38 mol. % argon, 25.5 mol. % ethane and 24 mol. % 1-butene. Such composition of the refrigerant of the invention is particularly useful if the cooling temperature to be achieved with the refrigerant is between 80 K and 90 K, particularly between 85 K to 90 K.

In certain embodiments, the first component is nitrogen in a mixture with neon and/or argon, the second component is methane, the third component is ethane or ethylene, and the fourth component is n-butane, isobutane, i-butene, propane, propylene, n-pentane or isopentane. Such composition of the precooling refrigerant is particularly useful if the intermediate temperature to be achieved in the precooling step is below 100 K.

In certain embodiments, the refrigerant composition comprises
10 mol. % to 23 mol. % nitrogen, and,
27 mol. % to 33 mol. % methane, and,
11 mol. % to 38 mol. % ethane, and,
16 mol. % to 30 mol. % n-butane, isobutane, isopentane, 1-butene or isobutane, or 20 mol. % to 40 mol. % propane,
provided that the sum of the concentrations of the abovementioned components does not exceed 100 mol %.

In certain embodiments, the refrigerant composition comprises 18 mol. % to 23 mol. % nitrogen, and/or 27 mol. % to 29 mol. % methane, and/or 24 mol. % to 37 mol. % ethane, and/or 18 mol. % to 24 mol. % isopentane or isobutane, provided that the sum of the concentrations of the abovementioned components does not exceed 100 mol %. Such composition of the refrigerant of the invention is particularly useful if the cooling temperature to be achieved with the refrigerant is around 100 K.

In certain embodiments, the refrigerant composition consists of 18 mol. % nitrogen, 27 mol. % methane, 37 mol. % ethane and 18 mol. % isopentane. Such composition of the refrigerant of the invention is particularly useful if the cooling temperature to be achieved with the refrigerant is around 100 K.

In certain embodiments, the refrigerant composition consists of 23 mol. % nitrogen, 29 mol. % methane, 24 mol. % ethane and 24 mol. % isobutane. Such composition of the refrigerant of the invention is particularly useful if the cooling temperature to be achieved with the refrigerant is around 100 K.

In certain embodiments, the refrigerant composition consists of 22 mol. % nitrogen, 29 mol. % methane, 28 mol. % ethane, 12 mol. % isobutane and 9 mol. %) isopentane. Such composition of the refrigerant of the invention is particularly useful if the cooling temperature to be achieved with the refrigerant is around 100 K.

According to a further aspect of the invention, the use of the refrigerant composition of the invention, particularly as a precooling refrigerant, in the liquefaction of a gaseous substance is provided.

In certain embodiments, the gaseous substance is selected from the group comprised of hydrogen and helium.

According to another aspect of the invention, a method for liquefaction of a feed gas stream is provided. The method comprises the steps of:
  providing a feed gas stream comprising a gas, wherein the feed gas stream is characterized by an initial temperature,
  precooling the feed gas stream from the initial temperature to an intermediate temperature in a precooling step by a closed precooling cycle with a precooling refrigerant yielding a precooled feed gas stream,
  cooling the precooled feed gas stream in a cooling step from the intermediate temperature to a temperature equal or below the boiling temperature or the critical temperature of the gas,
wherein the precooling refrigerant stream, comprises or consists of the refrigerant composition of the invention.

The term boiling temperature refers to the temperature at which the gas liquefies or begins to liquefy. The boiling temperature is dependent on the pressure of the gas.

In certain embodiments, the feed gas is selected from hydrogen and helium. The feed gas may comprise hydrogen. The feed gas may comprise helium.

In certain embodiments, the feed gas stream consists of hydrogen or helium.

Particularly, if the gas to be liquefied is hydrogen, ortho hydrogen comprised within the feed gas stream (typically about 75%) is preferably converted to higher para hydrogen fractions preferably before liquefaction of the feed gas stream to avoid that the exothermic ortho to para reaction takes place in the liquid product possibly resulting in an undesired partial vaporization of the liquid hydrogen product during storage and transport.

In certain embodiments, the precooled feed gas stream is cooled from the intermediate temperature to a temperature below the boiling temperature or the critical temperature of the gas by at least a first closed cooling cycle with a first cooling refrigerant, particularly in a first cooling zone, wherein the first cooling refrigerant is expanded, thereby producing cold.

In certain embodiments, the first refrigerant comprises or consists of hydrogen and/or helium.

In certain embodiments, the first refrigerant is provided with a high pressure, expanded to low pressure in an expansion device. The expansion device is preferably: a turbo expander, a throttle valve or a turbo expander and a throttle valve. The expanded first refrigerant and the precooled feed gas stream may be guided such that heat can indirectly be transferred between the expanded first refrigerant and the precooled feed gas stream, thereby preferably cooling the precooled feed gas stream below the boiling temperature or the critical temperature of the gas comprised within the feed gas stream. The expanded refrigerant may be compressed to high pressure yielding the first refrigerant.

In certain embodiments, the precooled feed gas stream is cooled from the intermediate temperature to a first temperature by a second closed cooling cycle with a second cooling refrigerant, particularly in a second cooling zone, wherein the second cooling refrigerant is expanded, thereby producing cold, and the cooled feed gas stream is further cooled from the first temperature to the temperature below the boiling temperature or the critical temperature of the gas comprised within the feed gas stream by the first closed cooling cycle.

In certain embodiments, the second refrigerant comprises or consists of neon and/or hydrogen.

In certain embodiments, the second refrigerant is provided with an initial high pressure, and is then expanded to low pressure in: an expansion device, preferably: a turbo expander; a throttle valve; in two turbo expanders; or in a turbo expander and a throttle valve The expanded second refrigerant and the precooled feed gas stream may be guided such that heat can indirectly be transferred between the expanded second refrigerant and the precooled feed gas stream, (preferably cooling the precooled feed gas stream to the first temperature) yielding a cooled feed gas stream. The expanded second refrigerant may be compressed to high pressure yielding the second refrigerant. The cooled feed gas stream and the expanded first refrigerant stream may be guided such that heat can indirectly be transferred between the cooled feed gas stream and the expanded first refrigerant stream, thereby preferably cooling the cooled feed gas to a temperature equal to or below the boiling temperature or the critical temperature of the gas comprised within the feed gas stream.

In certain embodiments, the first cooling zone is arranged within a cooling heat exchanger or one or more blocks of the cooling heat exchanger. In certain embodiments, the second cooling zone is arranged within another cooling heat exchanger or within one or more another blocks of the aforementioned cooling heat exchanger. In certain embodiments, the cooling heat exchanger is a plate heat exchanger.

In certain embodiments, the intermediate (precooling) temperature is in the range of 80 K to 125 K. In certain embodiments, the intermediate temperature is in the range of 80 K to 120 K. In certain embodiments, the intermediate temperature is in the range of 85 K to 120 K. In certain embodiments, the intermediate temperature is in the range of 90 K to 120 K, particularly in the range 90 K to 110 K, most particularly 95 K to 105 K. In certain embodiments, the intermediate temperature is 100 K. In certain embodiments, the intermediate temperature is in the range of 120 K to 150 K.

In certain embodiments, the feed gas stream and other cooling down refrigerant streams (such the above mentioned first refrigerant stream and/or second refrigerant stream) are precooled to the intermediate temperature in a precooling zone. In certain embodiments, the precooling zone is located within an at least one precooling heat exchanger or in one or more other blocks of the abovementioned cooling heat exchanger. In certain embodiments, the at least one precooling heat exchanger is a plate heat exchanger or a coil-wound heat exchanger.

In certain embodiments, the feed gas stream comprises hydrogen and is precooled to an intermediate temperature in the range 80 K to 120 K, yielding the precooled feed gas stream, and the precooled feed gas stream is brought into contact with a catalyst being able to catalyse the ortho to para conversion of hydrogen. In certain embodiments, the catalyst is or comprises hydrous ferric oxide. In certain embodiments, the catalyst is arranged within a heat exchanger in which the feed gas stream is precooled. The catalyst may be arranged within the at least one precooling heat exchanger or the one or more blocks of the above-mentioned cooling heat exchanger.

In certain embodiments, residual impurities, particularly nitrogen, are removed from the precooled feed gas stream before contacting the precooled feed stream with the above-mentioned catalyst, particularly by means of an adsorber. In certain embodiments, an adiabatic or isothermal ortho-para catalytic converter vessel is placed directly downstream or within the adsorber, wherein normal hydrogen comprised within the feed gas stream is converted in a first step to a para-content near the equilibrium at the intermediate temperature, e.g. 39% at 100 K).

In certain embodiments, the precooling step comprises the steps of:
    providing the precooling refrigerant with a first pressure,
    expanding the precooling refrigerant stream in an expansion device to a second pressure level yielding an expanded precooling refrigerant stream,
    guiding the expanded precooling refrigerant stream and the feed gas stream such that heat can indirectly be transferred between the expanded precooling refrigerant stream and the gas feed stream, thereby particularly cooling the feed gas stream, and
    compressing the expanded precooling refrigerant to the high pressure level, particularly to the first pressure, in a first precooling compressor.

In the above described precooling step, the step of guiding the precooling stream and the feed gas stream may include guiding the expanded precooling refrigerant stream, the feed gas stream and other refrigerant streams (e.g. high pressure precooling refrigerant as well as other cold-cycle refrigerant streams such as the above mentioned first and second refrigerant) such that heat can indirectly be transferred between the expanded precooling refrigerant stream and the other streams, thereby particularly cooling the feed gas stream as well as other cooling down streams to the intermediate temperature.

The term "indirectly heat transfer" in the context of the present invention refers to the heat transfer between at least two fluid streams that are spatially separated such that the at least two fluid streams do not merge or mix but are in thermal contact, e.g. two fluid streams are guided through two cavities and both streams do not mix, but heat can be transferred via the wall or the plate, for example of a plate heat exchanger, wherein the cavities are separated from each other by a wall or plate.

In certain embodiments, the first pressure is in the range of 20 bar(a) to 80 bar(a), more particularly in the range of 30 bar(a) to 60 bar(a), most particularly in the range of 40 bar(a) to 60 bar(a).

In certain embodiments, the first pressure is in the range of 60 bar(a) to 75 bar(a). In certain embodiments, the second pressure is in the range of 1.1 bar(a) to 10 bar(a), more particularly in the range of 1.1 bar(a) to 8 bar(a), most particularly in the range of 2 bar(a) to 6 bar(a).

In certain embodiments, the expanded precooling refrigerant stream has a temperature in the range of 80 K to 150 K, preferably in the range of 80 k to 120 K, more preferably in the range of 90 K to 120 K, more preferably in the range of 90 K to 110 K, most preferably in the range of 95 K to 105 K. In certain embodiments, the expansion device is a throttle valve.

In certain embodiments, compressing the precooling refrigerant comprises the steps of:
    compressing the expanded precooling refrigerant stream in a first precooling compressor or a first compressor stage of the first precooling compressor to an intermediate pressure yielding an intercooled precooling refrigerant stream,
    separating the intercooled precooling refrigerant stream into a mainly liquid precooling refrigerant stream and a mainly gaseous precooling refrigerant stream, wherein
        the mainly liquid precooling refrigerant stream is pumped to the high pressure level, preferably to the first pressure, and
        the mainly gaseous precooling refrigerant stream is compressed in a second compressor or a second compressor stage of the first precooling compressor to the high pressure level, preferably to the first pressure, and
    merging the compressed mainly liquid precooling refrigerant stream and the compressed mainly gaseous precooling refrigerant stream to form the precooling refrigerant stream.

In certain embodiments, the expanded precooling refrigerant stream is compressed in at least two compressor stages or compressors, optionally with intercooling. Alternatively, the precooling refrigerant is compressed in the two phase region after intercooling with a pump and a phase separator between the compressor stages or the compressor stages, wherein as described above liquid phases and vapour phases of the precooling refrigerant stream are separately compressed. Alternatively, all liquid phases are unified and compressed together.

The intermediate pressure is designed between the low level, particularly the second pressure, and high pressure level, particularly the first pressure. In certain embodiments, the intermediate pressure is designed such that a liquid-vapour two-phase flow is generated at the compressor discharge after intercooling. In certain embodiments, the intermediate pressure is in the range of 10 bar(a) and 30 bar(a).

In certain embodiments, the precooling refrigerant stream is additionally separated into a mainly gaseous phase and a mainly liquid phase. The mainly gaseous phase and the mainly liquid phase may be separately expanded, preferably at different temperatures levels. The mainly gaseous phase and the mainly liquid phase may be guided with the feed gas stream, particularly in separate heat exchangers or separate heat exchanger blocks. In certain embodiments, the mainly gaseous phase and/or the mainly liquid phase are expanded in a throttle valve. In certain embodiments, both vapour and liquid phase are separately guided against the feed gas stream in the precooling zone.

In certain embodiments, the feed gas stream is provided with a pressure above the critical pressure of the gas comprised within the feed gas stream. In certain embodiments, the feed gas stream is provided with a pressure in the range of 15 bar(a) to 75 bar(a). In certain embodiments, the feed gas stream is provided with a pressure in the range of 25 bar(a) to 50 bar(a).

In certain embodiments, the cooled feed gas stream is expanded in an expansion device, and is thereby cooled. In certain embodiments, the expansion device is a turbo-expander or a throttle valve. In certain embodiments, the expansion device is a combination of a turbo-expander and a throttle valve. In certain embodiments, the cooled feed gas stream is expanded in the expansion device to a storage pressure, wherein particularly the storage pressure is in the range of 1 bar(a) to 3.5 bar(a), more particularly in the range of 1.8 bar(a) to 2.5 bar(a), even more particularly equal or close to the ambient pressure.

BRIEF DESCRIPTION OF THE DRAWINGS

In the following, further features and advantages of the present invention as well as preferred embodiments are described with reference to the Figures, wherein.

DESCRIPTION OF EMBODIMENTS

Figure 1:
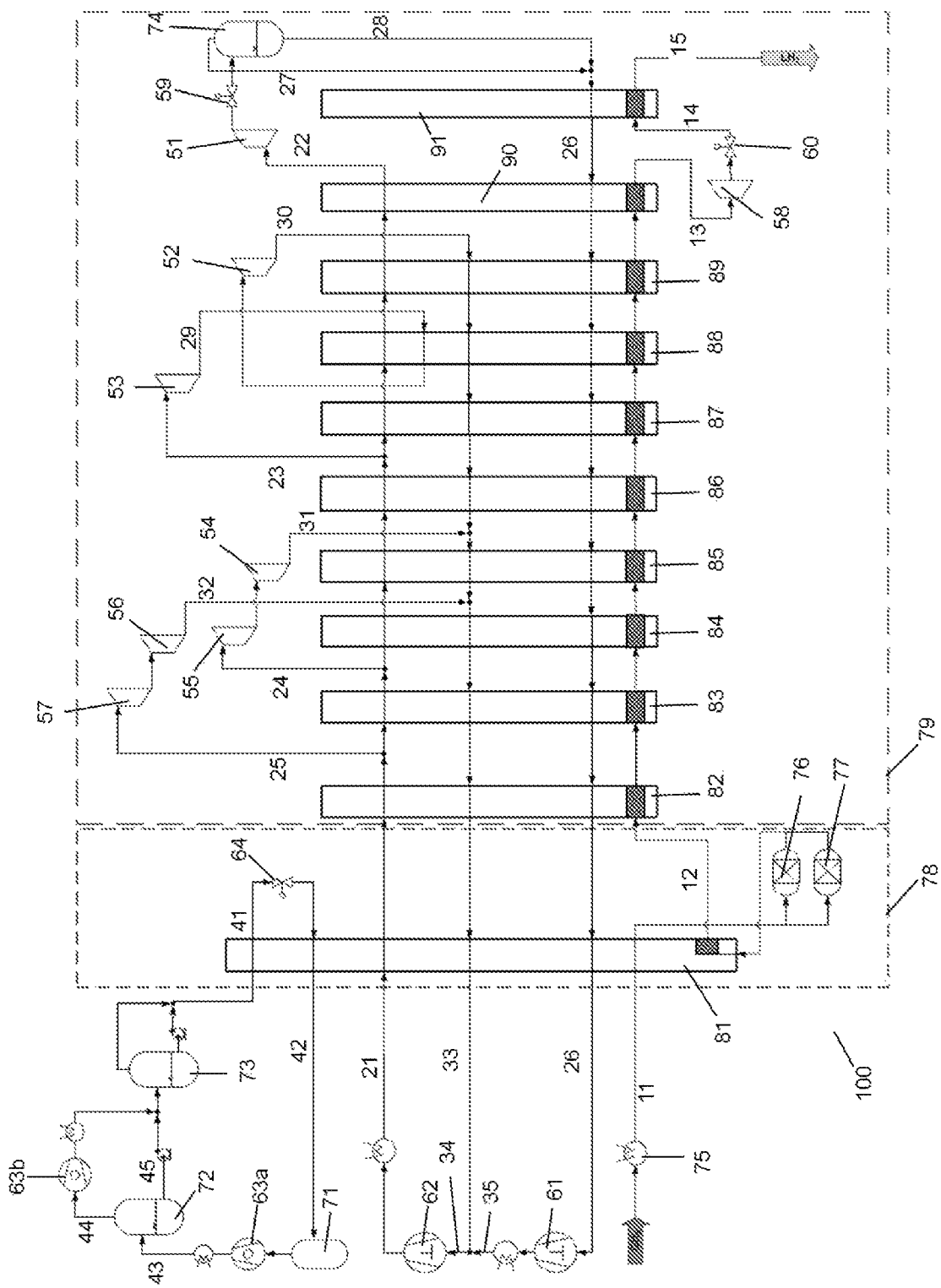
FIG. 1 shows a schematic illustration of a method according to an embodiment of the invention.

The present invention relates to novel refrigerant mixtures and compositions which have been particularly optimized for energy and cost efficient hydrogen precooling in hydrogen liquefiers. The refrigerant mixtures are particularly designed for closed-loop Joule-Thomson refrigeration cycles for large-scale industrial hydrogen liquefaction plants. The refrigerant mixtures are optimized for a low number of fluid components, preferably up to 4, and particularly for low-temperature cooling in the range between 80 K and 120 K, particularly between 90 K and 110 K. The mixtures have been designed for clog-free plant operation with margins to potential mixture or component freeze out (solidification) e.g. also through selected and effective melting-point depression.

The new proposed refrigerant mixtures and compositions allow a precooling cycle design and operation with comparatively low capital costs, industrially sound equipment e.g. heat exchanger size, and with reduced operational complexity. Compared to known technology and conceptual design for large-scale hydrogen liquefiers, the novel precooling refrigerant mixtures can reduce specific energy consumption of the liquefier by as much as 30%, thus enabling an economical production of liquid hydrogen on a large-scale. The present invention is used in the step of precooling the hydrogen feed gas stream as well as the precooling of other refrigerant streams to an intermediate temperature yielding a precooled feed gas stream. The invention is particular advantageous when, the intermediate temperature is in the range of 80 K to 150 K.

The novel refrigerant mixtures and compositions are used to provide precooling duty in a closed-loop refrigeration cycle e.g. in highly efficient single mixed-refrigerant (MR) cycles. The MR compositions in this invention have been optimized for hydrogen precooling temperatures particularly between 80 K and 120 K, thus differentiating itself from other large-scale industrial applications with warmer cooling temperatures, as natural gas liquefaction.

In the following the use of the refrigerant composition as a precooling refrigerant is exemplary illustrated in a process for hydrogen liquefaction. In other words the feed gas in the illustrative embodiments below comprises hydrogen. It will be appreciated that the invention includes embodiments in which the feed gas comprises helium, in accordance with the claims and statements above.

Hydrogen Cooling and Liquefaction:

A normal hydrogen (25% para) feed gas stream 11 from a hydrogen production plant is fed to the liquefaction plant 100 with a feed pressure above 15 bar(a), e.g. 25 bar(a), and a feed temperature near ambient temperature, e.g. 303 K. The feed stream 11 with a mass flow rate above 15 tpd, e.g. 100 tpd, is optionally cooled down between 283 K and 308 K, e.g. 298 K, with a cooling water system 75 or air coolers before entering the precooling cold-box 78 through plate-fin heat exchanger 81.

The hydrogen feed 11 is cooled in the aforementioned heat exchanger 81 to the lower precooling temperature T-PC, e.g. 100 K, by the warming-up the low pressure streams of the single mixed-refrigerant cycle 41 and the cold hydrogen refrigeration cycle (26 and 33). At the outlet of the heat exchanger 81, residual impurities are removed from the precooled hydrogen feed gas 12 to achieve a purity of typically 99.99% in the adsorber vessels 76, 77 by physisorption. The feed gas 12 enters the adsorption unit 76, 77 at the temperature T-PC, e.g. 100 K, which can thus be designed at about 20 K higher than in prior known hydrogen liquefier applications. This allows to shift the start of the catalytic ortho-para conversion to higher temperatures, e.g. 100 K, which is thermodynamically convenient.

Figure 2:
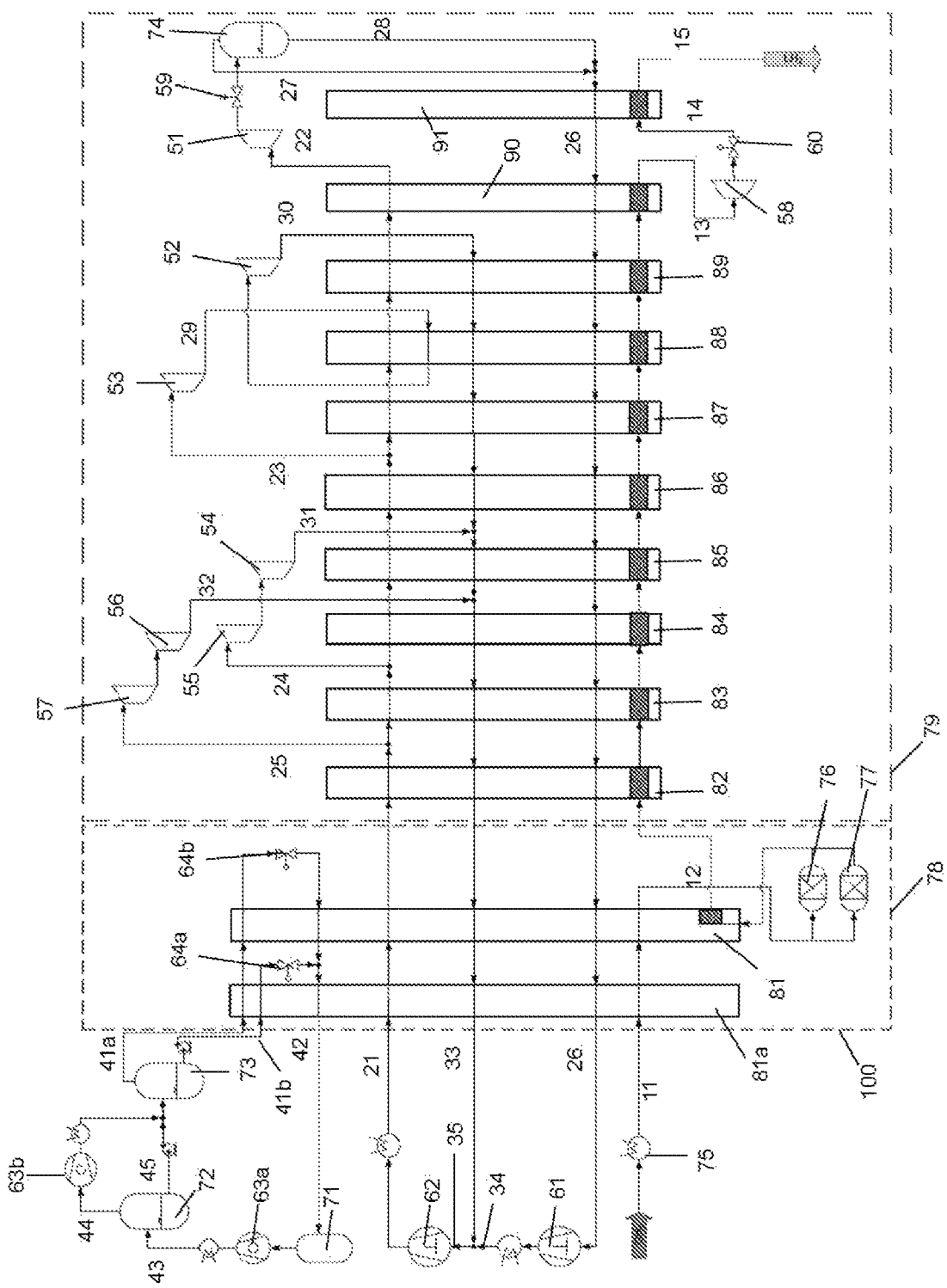
FIG. 2 shows another schematic illustration of a method according to another embodiment of the invention.

After the feed gas purification 76, 77, the precooled feed gas stream 12 is routed back to the heat exchanger through 81 the catalyst filled passages (hatched areas in FIG. 1 or 2) of the plate-fin heat exchanger 81, where the normal hydrogen (25% para) is catalytically converted to about 39% para while being cooled to T-PC, while the exothermic heat of conversion is being removed by the warming up refrigerants 42 in the heat exchanger 81.

The precooled feed gas stream 12 enters the vacuum-insulated liquefier cold-box 79 with T-PC (between 90 K and 120 K, e.g. 100 K). The feed stream 12 is subsequently cooled and liquefied as well as being catalytically converted to higher hydrogen para-fractions (hatched areas in FIG. 1 or 2) in plate-fin heat exchanger (82 to 90).

The hydrogen gas feed stream 11 from battery-limits may be further compressed e.g. from 25 bar(a) to higher pressures, e.g. 75 bar(a), to increase process efficiency and to reduce volumetric flows and equipment sizes by means of a one or two stage reciprocating piston compressor at ambient temperature, or a one stage reciprocating piston compressor with cold-suction temperatures after precooling in the heat exchanger 81 or an ionic liquid piston compressor.

Alternatively, an adiabatic ortho-para catalytic converter vessel may be used in the precooling cold box 78 to pre-convert normal-hydrogen (25%) para to a para-fraction near equilibrium in the feed gas stream 12 at the outlet of adsorber 76, 77, before routing the feed gas stream 12 back to the heat exchanger 81.

Detailed Description of the Single Mixed-Refrigerant Precooling Cold Cycle

A low pressure mixed refrigerant stream 42 is routed through suction drum 71 to avoid that entrained liquid droplets from the warmed-up refrigerant stream arrive to the suction side of compressor of stage one 63a of the compressor 63. The MR composition and the discharge pressure of the resulting refrigerant stream 43 (particularly in the range of 10 bar(a) to 25 bar(a)), after at least one compression stage, are optimized to produce the aforementioned stream 43 with a liquid fraction after intercooling. This reduces the mass-flow of refrigerant 43 that has to be compressed in stage two 63b of the compressor 63. The intercooled refrigerant stream 43 is separated into a liquid mixed refrigerant stream 45 that is pumped to the high pressure (particularly in the range of 30 bar(a) and 70 bar(a)) and into a vapour refrigerant stream 44, which is compressed to high pressure (particularly in the range of 25 bar(a) and 60 bar(a)) by the second stage 63b of compressor 63. Both the vapour 44 and the liquid stream 45 are mixed to a two-phase high pressure mixed-refrigerant stream 41 after compression 63. The first vapour stream 44 may be additionally separated into a second liquid phase and a second vapour phase, wherein preferably the first liquid phase 45 and the second liquid are unified, pumped together to high pressure and afterwards unified with the second vapour phase before entering the precooling cold box 78. Alternatively, the low pressure mixed refrigerant stream may be compressed by more than two stages. If compression and after-cooling results in the formation of a liquid phase, additionally phase separators may be arranged between the compressor stages.

The two-phase high pressure mixed-refrigerant stream 41 enters the precooling cold-box 78 passing through the heat exchanger 81, where it is precooled to the lower precooling temperature of 100 K. A Joule-Thomson valve 64 expands the precooled mixed-refrigerant stream 41 to an expanded mixed refrigerant stream 42 that is characterized by an optimized low pressure level, particularly between 1.5 bar(a) and 8 bar(a). The refrigerant mixture of the high pressure mixed refrigerant stream 41 is designed to cool down from the temperature T-PC by at least 2.5 K, e.g. 96 K, through the Joule-Thomson expansion. The mixture temperature decrease is designed to maintain a feasible temperature difference between warming up and cooling down streams in the heat exchanger 81 as well as to assure that no component freeze-out occurs in the refrigerant mixture.

Additionally, the two-phase high pressure mixed-refrigerant stream 41 may be further separated into a vapour 41*a* and a liquid phase 41*b*, wherein the liquid phase 41*b* may be additionally pumped to high pressure and unified with the vapour phase 41*b* before entering the precooling cold box 78. Alternatively, the vapour stream 41*a* of the above mentioned additional separation is guided through the heat exchanger 81 and an additional heat exchanger 81*a* or through two separate blocks 81, 81*a* of heat exchanger 81 in the precooling cold-box 78, expanded in a throttle valve 64*b* and guided again through both exchangers or blocks 81, 81*a*, whereby the liquid stream 41*b* of the additional separation is guided through the additional heat exchanger 81*a*, expanded in a throttle valve 64*a* and guided again through the additional exchanger 81*a*.

Figure 3:
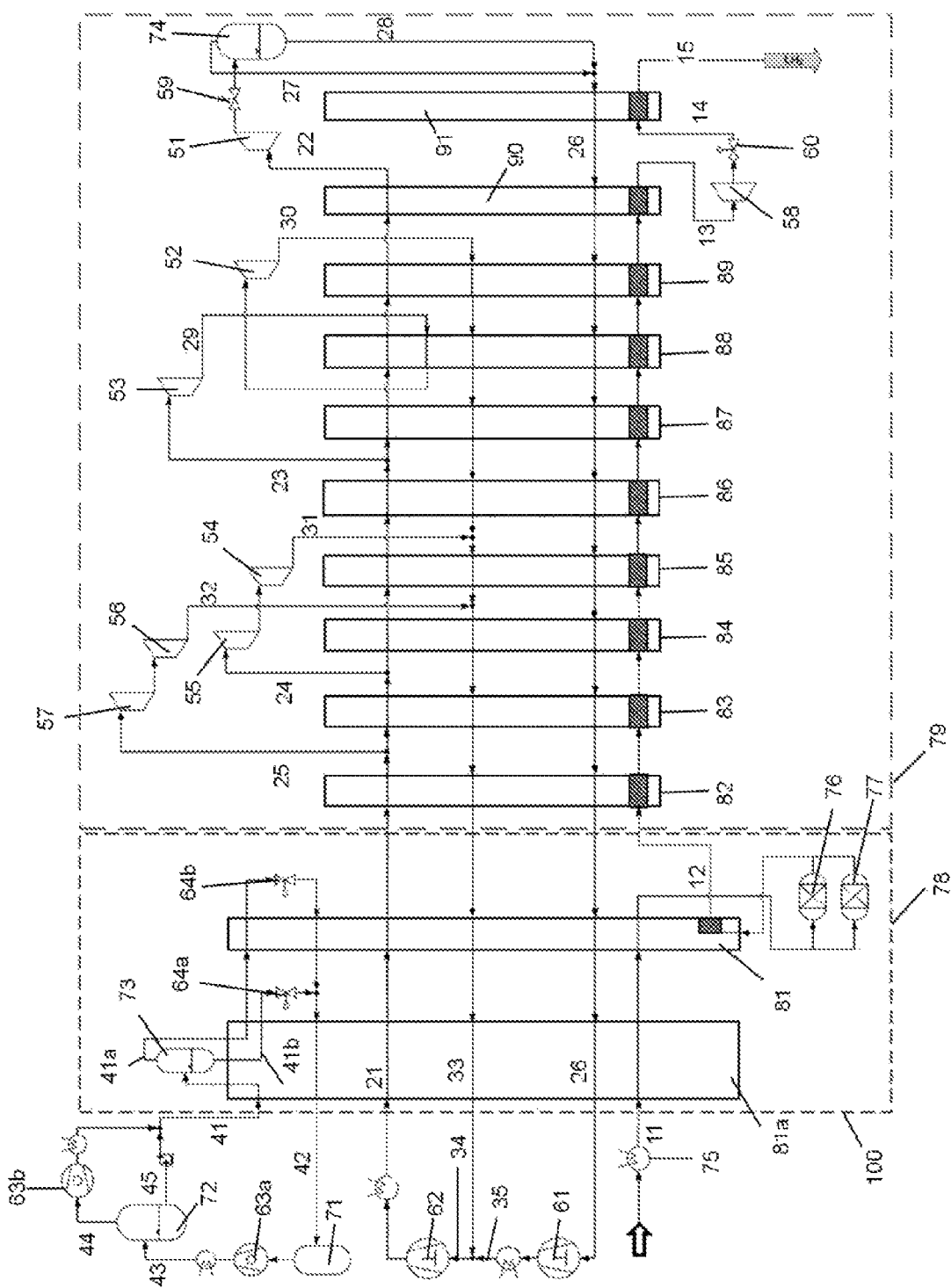
FIG. 3 shows a schematic illustration of a method according to further embodiment of the invention.

Alternatively as depicted in FIG. 3, the two-phase high pressure mixed-refrigerant stream 41 may be guided through the additional heat exchanger 81*a* or block, and thereby cooled, and separated into a vapour 41*a* and a liquid phase 41*b* in a phase separator 73. The vapour stream 41*a* of the above mentioned additional separation is then guided through the heat exchanger 81 and the additional heat exchanger 81*a* or through two separate blocks 81, 81*a* of heat exchanger 81 in the precooling cold-box 78, expanded in a throttle valve 64*b* and guided again through both exchangers or blocks 81, 81*a*, wherein the liquid stream 41*b* of the additional separation is guided through the additional heat exchanger 81*a* or block, expanded in a throttle valve 64*a* and guided again through the additional exchanger 81*a*.

Particularly, the vapour stream 41*a* may be merged after passing the heat exchanger 81 and expansion in the throttle valve 64*b* with the liquid stream 41*b* after passing the additional heat exchanger 81*a* and expansion in the throttle valve 64*a*, wherein the so merged expanded mixed-refrigerant stream 42 is then guided through the additional heat exchanger 81*a*.

The MR composition can be regulated and controlled by the make-up system to adapt the mixture composition to ambient conditions and changed process conditions. The mixed-refrigerant is compressed in a two-stage MR turbo-compressor with interstage water cooling to decrease power requirement.

Alternatively, in a very simplified configuration, the low pressure refrigerant stream 42 can be compressed within an at least two-stage compression 63 with inter-stage cooling and the refrigerant composition can be designed to avoid the appearance of a liquid fraction after the first compression stage 63*a*. Advantageously, no liquid pumps and no phase separator are required. However, a lower efficiency is expected.

Low temperature precooling is efficiently achieved with a refrigerant mixture optimized specifically for hydrogen liquefaction, wherein the refrigerant preferably contains only four refrigerant components to maintain a manageable plant makeup system. A preferred mixture composition for a precooling temperature in the range of 90 K to 100 K consists of 18 mol. % nitrogen, 27 mol. % methane, 37 mol. % ethane and 18 mol. % isopentane. Ethylene may replace the ethane component for reasons of refrigerant availability and cost. For precooling temperatures between 90 K and 100 K, iso-butane may be replaced by 1-butene, iso-pentane, propane or propylene The mixture of the mixed-refrigerant may be adapted depending on the precooling temperatures. Accordingly, the mixture may contain nitrogen, methane, ethylene, and n-butane, isobutane, propane, propylene isopentane, iso-butane and/or n-pentane for precooling temperatures between 100 K and 120 K (or higher).

For precooling temperatures above 85 K, the mixture may contain nitrogen, argon, neon, methane, ethane, propane, propylene, 1-butene.

Also alternatively, the hydrogen feed stream 11 may be precooled to temperatures above 120 K, wherein in this case the mixed-refrigerant preferably contains nitrogen, methane, ethylene, n-butane.

For slightly higher process efficiencies, a fifth or more refrigerant mixture component(s) can be added to the refrigerant mixture: iso-butane, iso-pentane, 1-butane, argon, neon, propane or propylene for precooling temperatures between 90 K and 100 K, or n-butane, iso-butane, iso-pentane, propane, propylene or pentane for the precooling temperature T-PC, particularly above 100 K, and additionally n-pentane, for precooling temperatures above 110 K.

Additionally, conventional refrigeration units (chiller), e.g. vapour compression refrigerators, operated with e.g. propane, propylene or CO2, can be placed to cool down the high pressure lines 11, 21, 41 from ambient temperature, downstream the respective water coolers 75, to increase the overall energy-efficiency of the plant. Chiller(s) can be placed in the Single Mixed-Refrigerant stream 41 and/or the Hydrogen Cold Refrigeration cycle stream 21 and/or the Feed Hydrogen stream 11.

Detailed Description of the Main Cooling High Pressure-Hydrogen Cycle

The high pressure hydrogen (first refrigerant) stream 21 with a pressure of at least 25 bar(a), particularly 30 bar(a) to 70 bar(a) enters the precooling cold-box 78 and is precooled by the warming up streams 42, 33, 26 in the heat exchanger 81 to the precooling temperature T-PC. At the inlet of the liquefier cold-box 79, the first refrigerant stream 21 is further precooled by the warming up streams of the cold hydrogen refrigeration cycle (33 and 26). The high pressure stream 21 is then separated in at least three turbine-strings, at different temperature levels, to generate cooling by nearly isentropic expansions (polytropic) in min. five turbine-expanders. In the illustrated example, seven turbine-expanders are employed (51 to 57) in to four partial streams 22, 23, 24, 25

22, 23, 24, 25 which are routed through four turbine strings. The turbines 51 to 57 within the high-pressure process are designed with rotational speeds and frame-sizes that are industrially feasible and allow the partial recovery of process energy e.g. by the means of turbine brakes coupled with a turbo-generator to produce electricity and thus increase the total plant energy-efficiency. Alternatively, each of the above mentioned turbine strings may comprise only one turbo-expander, respectively, wherein the respective stream is directly expanded to low or medium pressure.

In the preferred invention example, the high pressure hydrogen flow 21 is first separated after being cooled in a heat exchanger 82. One fraction, or partial stream (also referred to as a fourth partial stream) 25 is routed to a first turbine string (57 and 56), in which it is expanded in two-stages from high pressure to a medium pressure to form a medium pressure (fourth partial) stream 32, particularly in the range 6 bar(a) to 12.9 bar (a), more particularly in the range of 7 bar (a) to 11 bar(a), e.g. 9 bar(a), to achieve high isentropic efficiencies with moderate turbine rotational speeds. This medium pressure stream 32 provides cooling duty to the cooling down streams 12, 21 The remaining high pressure flow fraction is subsequently cooled in heat exchanger 83 to the temperature of a second turbine string. A further partial stream (also referred to as a third partial stream) 24 is then separated and expanded in two-stages (55 and 54) to the above-mentioned medium pressure level to form a partially expanded stream 31. This partially expanded (third partial) stream 31 is warmed up and mixed with the above-mentioned medium pressure stream 32 in order to provide additional cooling to duty to the cooling down streams 12, 21. The turbine strings for the streams 25 and 24 can, alternatively, be designed with intermediate cooling between the two expansion stages.

A further remaining high pressure flow fraction, or partial stream (also referred to as the second partial stream) 23 routed to a third turbine string after being further cooled down by the warming up streams in heat exchanger(s) 85, 86. The following process feature is special to this hydrogen liquefaction process: the second partial stream 23 is expanded in turbo-expander 53 to an intermediate pressure between medium pressure and high pressure, to produce an intermediate pressure stream 29. The resulting intermediate pressure stream 29 preferably has a temperature above the critical temperature of the refrigerant, e.g. 34 K to 42 K. The intermediate pressure stream 29 is then re-warmed slightly in a further heat exchanger 88 before being expanded again in turbo-expander 52 to the medium pressure level yielding a medium pressure (first partial) stream 30. In this way, cooling with the third turbine string is generated at two different pressures (medium and intermediate pressure) and two different temperature levels. The heat exchanger enthalpy-temperature curve between the cooling down and warming up streams in a critical temperature range, e.g. 30 K to 50 K, can, hence, be matched more closely. This can reduce exergetical losses in the heat exchanger. This new process configuration is particularly beneficial for hydrogen feed cooling since: depending on the pressure, the specific isobaric heat capacity of the hydrogen feed stream possesses steep gradients in the region close to its critical temperature (particularly between 30 K and 50 K). Alternatively in an embodiment not shown, the third turbine string for the second partial stream 23 can be designed analogous to first and second turbine strings 25 and 24, with no intermediate warming-up after the first turbine, or with a slight cooling down between the expanders.

The medium pressure stream 30 provides cooling duty to the cooling down streams in the heat exchanger 86 to 89 up to the temperature of turbine outlet 54, where it is mixed with the medium pressure stream 31 to form a mixed stream. The mixed stream is warmed approximately to the temperature of the turbine 56 outlet (between the precooling temperature and the temperature of cooled feed stream 13 at the cold end of the heat exchanger 89, where it is further mixed with the medium pressure stream 32. The total medium pressure hydrogen flow 33 is warmed up in the heat exchangers 84 to 81 to a temperature close to ambient temperature, thereby providing additional cooling duty to the cooling down streams 11, 21, 41.

The outlet temperature and pressure of turbo-expander 52 are optimized in combination with the cold-end hydrogen cycle. The temperature of the medium pressure stream 30 at the turbine outlet is the cold-end temperature T-CE. For the newly proposed high pressure cycle, optimal cold-end temperatures T-CE for the high pressure cycle are set between 28 K and 33 K, particularly between 29 K and 32 K, for a dry-gas turbine discharge and an optimal MP1 pressure level, particularly in the range of 6 bar(a) and 12.9 bar(a), more particularly between 7 bar(a) and 11 bar(a), at the outlet of the turbo-expander 52 (medium pressure level between 7 bar(a) and 11 bar(a)). The warmed-up stream 33 is mixed with the compressed low pressure stream 26 from the compressor 61 to produce a mixed stream 34. The mixed stream 34 is compressed from medium pressure level in e.g. one or preferably two parallel running 100% reciprocating piston compressors 62, or alternatively three parallel running 50% reciprocating piston compressors to the high pressure level between 30 bar(a) and 75 bar(a). Temperature T-CE, medium and high pressure levels are optimized in function of precooling temperature TPC and liquid hydrogen production rate (feed mass flow rate). Piston compressors 61 and 62 are designed with at least two intercooled stages each (three stages preferred).

Compared to prior known technology, this high pressure configuration with significantly higher turbine outlet pressure levels (medium and high) yields moderate effective volumetric flows at the suction of compressor 62, thus enabling the design of mechanically viable frame-sizes for the hydrogen piston compressor, even for very large liquefaction capacities e.g. up to 150 tpd (with two parallel compressors).

At the cold end, the remaining high pressure hydrogen flow fraction, the first partial stream 22 in the cold-cycle provides the cooling for the final liquefaction and ortho-para conversion of the feed stream. The high pressure hydrogen refrigerant in the first partial stream 22 is expanded from high pressure to low pressure in at least one turbine string though at least one turbo-expander e.g. 51.

If the turbo-expander 51 is to be designed with a dry-gas discharge, high pressure stream 22 is expanded from high pressure to an intermediate pressure, above the critical pressure, e.g. 13 bara, or to a pressure below, e.g. in the range of 5 bar(a) to 13 bar(a), if no two-phase is to be generated within the turbine 51 or at the outlet of the turbine 51. Subsequently, the cooled stream is expanded through a Joule-Thomson throttle valve 59 into a gas-liquid separator 74. For a turbo-expander with allowed two-phase discharge, e.g. a wet expander, the high pressure stream 22 can be expanded directly to low pressure level. The low pressure stream 26 stream is warmed-up to near ambient temperature providing cooling duty to the cooling down streams 11, 12, 21, 41 in the precooling and liquefier cold-box. The low pressure stream 26 is then compressed in one multistage reciprocating piston compressor 61 with interstage cooling.

The hydrogen feed stream 12 is cooled by the warming up cold low pressure stream 26 down to a temperature equal to the high pressure stream 22, e.g. 29.5 K, and is catalytically converted to a para-fraction slightly below the equilibrium para-fraction. The cooled feed stream 13 is then expanded by the means of at least one turbo-expander 58 from feed pressure to an intermediate pressure e.g. 13 bar(a) or lower. Subsequently, the expanded and cooled feed stream is further expanded through the Joule-Thomson throttle valve 60 to the low pressure level that is required for final product storage pressure e.g. 2 bar(a) and particularly further cooled by the low pressure stream 26.

For turbo-expanders allowing a two-phase discharge, the high pressure feed stream 13 can be directly expanded into the two-phase region to the product storage pressure e.g. 2 bar(a). For shaft power around 50 kW or above, as in large-scale liquefiers with e.g. 100 tpd capacity, a turbo-expander with energy-recovery via a turbo-generator can be employed to raise the plant energy-efficiency. Alternatively, a cold liquid piston expander can be employed to directly expand the feed stream from the intermediate pressure level, e.g. 13 bar(a), to the low pressure level near the final product storage pressure. In either case, the two-phase hydrogen feed stream 14 is finally cooled and can be further catalytically converted in the last part of plate-fin heat exchanger 91 with the aid of the warming-up low pressure cold-cycle refrigerant stream 26.

With this configuration, a liquid hydrogen product stream 15 at the outlet can be generated as saturated liquid or even subcooled liquid. A final para-fraction of the liquid product stream 15 above 99.5% can be reached if desired.

The method of the invention offers the following advantages:

In summary:

Significant decrease in total specific energy demand and specific costs for the production of liquid hydrogen on a large-scale compared to prior known technologies.

Highly efficient and simple mixed refrigerant for low-temperature closed-loop Joule-Thomson precooling cycle in large-scale hydrogen liquefiers, compared to state-of-the art precooling via e.g. liquid nitrogen stream evaporation at about 78 K.

Refrigerant mixture is specifically optimized for hydrogen liquefaction and enabling particularly low precooling temperatures between 80 K and 120 K, which are significantly lower than in other known large-scale industrial mixed-refrigerant technology application.

The mixture can be adapted depending on the precooling temperature design.

Low precooling temperature mixed-refrigerant combines the benefits of energy-efficient single mixed-refrigerant cycles with comparatively low precooling temperatures. Low precooling temperatures are beneficial to the liquefier plant design because of the decreased cooling duty to be provided by the colder refrigeration cycle(s) e.g. hydrogen closed-loop, thus reducing the size of cold refrigeration cycle equipment, which is the plant capacity limiting factor e.g. heat exchanger/liquefier cold box, compressors and turbines.

Refrigerant mixture compositions optimized for cooling across Joule-Thomson expansion valve and for clog-free plant operation, by avoiding hazardous component freeze out within the process due to potential mixture melting.

Low temperature refrigerant mixture for hydrogen liquefiers is particularly designed for energy efficient precooling with only 4 refrigerant components to design a manageable plant makeup and a simple plant gas management.

Specified mixed refrigerant allows the design of the continuous catalytic ortho-para conversion directly after the precooling at a higher temperature level, e.g. 100 K, compared to prior known hydrogen liquefaction plants (around 80 K). Due to the removal of exothermic heat of conversion at a higher temperature level, the thermodynamic efficiency of the plant is improved.

Advantageously, impurity adsorption in hydrogen feed stream, e.g. nitrogen removal, can be performed directly after low temperature precooling and prior to catalytic ortho-para conversion, e.g. at 100 K, thus reducing adsorber vessel dimensions. Physisorption process improves with decreasing temperature. Adsorption vessel removes residual impurities from the hydrogen feed which can poison hydrogen ortho-para catalysts.

| Reference numerals: | |
|---|---|
| 100 | liquefaction plant |
| 11 | feed stream |
| 12 | precooled feed stream |
| 13 | cooled feed stream |
| 14 | expanded cooled feed stream |
| 15 | Liquid product stream |
| 21 | high pressure refrigerant stream |
| 22 | high pressure first partial stream |
| 23 | high pressure second partial stream |
| 24 | high pressure third partial stream |
| 25 | high pressure fourth partial stream |
| 26 | low pressure first partial stream |
| 27 | vapour phase of low pressure first partial stream |
| 28 | liquid phase of low pressure first partial stream |
| 29 | intermediate pressure second partial stream |
| 30 | medium pressure second partial stream |
| 31 | medium pressure third partial stream |
| 32 | medium pressure fourth partial stream |
| 33 | combined medium pressure stream |
| 34 | further combined medium pressure stream |
| 35 | medium pressure first partial stream |
| 41 | high pressure mixed (second) refrigerant stream |
| 41a | vapour phase of high pressure mixed refrigerant stream |
| 41b | Liquid phase of high pressure mixed refrigerant stream |
| 42 | low pressure mixed refrigerant stream |
| 43 | medium pressure mixed refrigerant stream |
| 44 | vapour phase of medium pressure mixed refrigerant stream |
| 45 | liquid phase of medium pressure mixed refrigerant stream |
| 51, 52, 53, 54, 55, 56, 57, 58 | turbo-expander |
| 59, 60, 64, 64a, 64b | throttle valve |
| 61 | piston compressor |
| 62 | piston compressor |
| 63a | first compressor stage |
| 63b | second compressor stage |
| 71 | suction drum |
| 72, 73, 74 | phase separator |
| 75 | water cooling |
| 76, 77 | adsorber vessel |
| 78 | pre cooling cold box |
| 79 | liquefier cold box |
| 81, 82, 83, 84, 85, 86, 87, 88, 89, 90, 91 | heat exchanger block or heat exchanger filled with ortho-para catalyst (hatched area) |

The invention claimed is:

1. A method for liquefying a feed gas stream, the method comprising:
   providing said feed gas stream comprising a gas wherein said gas is hydrogen or helium, and wherein said feed gas stream has an initial temperature,
   precooling said feed gas stream from said initial temperature to an intermediate temperature in a precooling step by a closed loop cooling cycle with a precooling refrigerant stream yielding a precooled feed gas stream,
   cooling said precooled feed gas stream in a cooling step from said intermediate temperature to a temperature below the boiling temperature or the critical temperature of said gas,
   wherein said precooling refrigerant stream comprises a refrigerant composition selected from the following compositions (a), (b), and (c):
   composition (a) consisting of:
      a first component, a second component, a third component and a fourth component, wherein
      said first component is nitrogen in the range of 5 mol. % to 35 mol. %,
      said second component is methane in the range of 20 mol. % to 40 mol. %,
      said third component, is ethane or ethylene in the range of 10 mol. % to 45 mol. %, and
      said fourth component is one of n-butane, isobutane, 1-butene, n-pentane or isopentane in the range of 10 mol. % to 35 mol. %, or propane or propylene in the range of 10 mol.% to 45 mol. %,
      provided that the sum of the concentrations of the components does not exceed 100 mol. %;
   composition (b) consisting of:
      a first component, a second component, a third component, a fourth component, and a fifth component wherein
      said first component is nitrogen in the range of 5 mol. % to 35 mol. %,
      said second component is methane in the range of 20 mol. % to 40 mol. %,
      said third component is ethane or ethylene in the range of 10 mol.% to 45 mol. %, and
      said fourth component is one of n-butane, isobutane, 1-butene, n-pentane or isopentane in the range of 10 mol. % to 35 mol. %, or propane or propylene in the range of 10 mol. % to 45 mol. %, and
      said fifth component is one of n-butane, isobutane, propane, propylene, n-pentane and
      provided that the sum of the concentrations of the components does not exceed 100 mol. %; and
   composition (c) consisting of:
      a first component, a second component, a third component, a fourth component, and a fifth component, and a sixth component wherein
      said first component is nitrogen in the range of 5 mol. % to 35 mol. %,
      said second component is methane in the range of 20 mol. % to 40 mol. %,
      said third component is ethane or ethylene in the range of 10 mol.% to 45 mol. %, and
      said fourth component is one of n-butane, isobutane, 1-butene, n-pentane or isopentane in the range of 10 mol. % to 35 mol. %, or propane or propylene in the range of 10 mol. % to 45 mol. %,
      said fifth component is one of n-butane, isobutane, propane, propylene, n-pentane and isopentane, wherein said fifth component is different from said fourth component, and
      said sixth component is one of n-butane, isobutane, propane, propylene, n-pentane and isopentane, and wherein said sixth component is different from said fourth component and said fifth component,
      provided that the sum of the concentrations of the components does not exceed 100 mol. %.

2. The method according to claim 1, wherein said composition is composition (b).

3. The method according to claim 1, wherein said composition is composition (c).

4. The method according to claim 1, wherein said composition is composition (a).

5. The method according to claim 1, wherein said fourth component is isobutane, isopentane or 1-butene in the range of 10 mol. % to 35 mol. %, or propane or propylene in the range of 10 mol. % to 45 mol. %.

6. The method according to claim 1, wherein said composition is composition (a) and consists of:
   11 mol. % nitrogen, 33 mol. % methane, 31 mol. % ethane and 25 mol. % n-butane, or
   12 mol. % nitrogen, 32 mol. % methane, 31 mol. % ethane and 25 mol. % n-butane, or
   14 mol. % nitrogen, 32 mol. % methane, 29 mol. % ethane and 25 mol. % isobutane, or
   16 mol. % nitrogen, 31 mol. % methane, 27 mol. % ethane and 26 mol. % isobutane, or
   11 mol. % nitrogen, 32 mol. % methane, 38 mol. % ethane and 19 mol. % isopentane, or
   22 mol. % nitrogen, 30 mol. % methane, 24 mol. % ethane and 24 mol. % isobutane, or
   17 mol. % nitrogen, 33 mol. % methane, 24 mol. % ethane and 26 mol. % isobutane, or
   18 mol. % nitrogen, 29 mol. % methane, 36 mol. % ethane and 17 mol. % isopentane, or
   18 mol. % nitrogen, 27 mol. % methane, 37 mol. % ethane and 18 mol. % isopentane, or
   20 mol. % nitrogen, 30 mol. % methane, 26 mol. % ethane and 24 mol. % 1-butene, or
   20 mol. % nitrogen, 30 mol. % methane, 24 mol. % ethane and 26 mol. % 1-butene, or
   18 mol. % nitrogen, 27 mol. % methane, 37 mol. % ethane and 18 mol. % isopentane, or
   23 mol. % nitrogen, 29 mol. % methane, 24 mol. % ethane and 24 mol. % isobutane.

7. The method according to claim 1, wherein said composition is composition (b) and consists of: 22 mol. % nitrogen, 29 mol. % methane, 28 mol. % ethane, 12 mol. % isobutane and 9 mol. % isopentane.

8. The method according to claim 1, wherein said precooling step comprises:
   providing said precooling refrigerant stream with a first pressure,
   expanding said precooling refrigerant stream in a first expansion device to a second pressure yielding an expanded precooling refrigerant stream,
   guiding said expanded precooling refrigerant stream and said feed gas stream such that heat can indirectly be transferred between the expanded precooling refrigerant stream and said feed gas stream, thereby cooling said feed gas stream to said intermediate temperature, and
   compressing said expanded precooling refrigerant to said first pressure in a first precooling compressor.

9. The method according to claim 1, wherein said feed gas stream comprises hydrogen and is precooled in said precooling step to a temperature equal or above 80 K, yielding said precooled feed gas stream and said precooled feed gas stream is brought into contact with a catalyst that is being able to catalyze conversion of ortho hydrogen to para hydrogen.

10. The method according to claim 9, wherein said feed gas stream is precooled in said precooling step to a temperature in the range of 85 K to 120 K to yield said precooled feed gas stream.

11. The method according to claim 1, wherein feed gas stream consists of hydrogen or helium.

12. The method according to claim 1, wherein the intermediate temperature is in the range of 80 K to 150 K.

13. The method according to claim 1, wherein said cooling of said precooled feed gas stream is performed using a second refrigerant which comprises neon and/or hydrogen.

14. A method of liquefying a feed gas stream, the method comprising:
providing a feed gas stream comprising a gas wherein said gas is hydrogen or helium, and wherein said feed gas stream has an initial temperature,
precooling said feed gas stream from said initial temperature to an intermediate temperature in a precooling step by a closed loop cooling cycle with a precooling refrigerant stream yielding a precooled feed gas stream,
cooling said precooled feed gas stream in a cooling step from said intermediate temperature to a temperature below the boiling temperature or the critical temperature of said gas,
wherein said preceding refrigerant stream comprises a refrigerant composition selected from the following compositions (a), (b), and (c):
composition (a) consisting of:
a first component, a second component, a third component, and a fourth component, wherein
said first component is nitrogen in the range of 5 mol. % to 35 mol. %,
said second component is argon in the range of 20 mol. % to 40 mol. %,
said third component is ethane or ethylene in the range of 10 mol. % to 40 mol. %, and
said fourth component is one of isobutane, isopentane or 1-butene in the range of 10 mol. % to 35 mol. %, or propane or propylene in the range of 10 mol. % to 45 mol. %,
provided that the sum of the concentrations of the components does not exceed 100 mol. %;
composition (b) consisting of:
a first component, a second component, a third component, a fourth component, and a fifth component wherein
said first component is nitrogen in the range of 5 mol. % to 35 mol. %,
said second component is argon in the range of 20 mol. % to 40 mol. %,
said third component is ethane or ethylene in the range of 10 mol. % to 45 mol. %, and
said fourth component is one of isobutane, isopentane or 1-butene in the range of 10 mol. % to 35 mol. %, or propane or propylene in the range of 10 mol. % to 45 mol. %, and
said fifth component is one of n-butane, isobutane, propane, propylene, n-pentane and isopentane, wherein said fifth component is different from said fourth component, provided that the sum of the concentrations of the components does not exceed 100 mol. %; and
composition (c) consisting of:
a first component, a second component, a third component, a fourth component, a fifth component, and a sixth component wherein
said first component is nitrogen in the range of 5 mol. % to 35 mol. %,
said second component is argon in the range of 20 mol. % to 40 mol. %,
said third component is ethane or ethylene in the range of 10 mol. % to 40 mol. %, and
said fourth component is one of isobutane, isopentane or 1-butene in the range of 10 mol. % to 35 mol. %, or propane or propylene in the range of 10 mol. % to 45 mol. %, and
said fifth component is one of n-butane, isobutane, propane, propylene, n-pentane and isopentane, wherein said fifth component is different from said fourth component, and
said sixth component is one of n-butane, isobutane, propane, propylene, n-pentane and isopentane, and wherein said sixth component is different from said fourth component and said fifth component,
provided that the sum of the concentrations of the components does not exceed 100 mol. %.

15. The method according to claim 14, wherein said composition is composition (a) and consists of 12.5 mol. % nitrogen, 38 mol. % argon, 25.5 mol. % ethane and 24 mol. % 1-butene.

16. A method for liquefying a feed gas stream, the method comprising:
providing a feed gas stream comprising a. gas wherein said gas is hydrogen or helium, and wherein said feed gas stream has an initial temperature,
precooling said feed gas stream from said initial temperature to an intermediate temperature in a precooling step by a closed loop cooling cycle with a precooling refrigerant stream yielding a precooled feed gas stream.
cooling said precooled feed gas stream in a cooling step from said intermediate temperature to a temperature below the boiling temperature or the critical temperature of said gas,
wherein said precooling refrigerant stream comprises a refrigerant composition consisting of a first component, a second component, a third component, and a fourth component, wherein:
(a) said first component is nitrogen in an amount of 8 mol. % to 18 mol. %,
said second component is methane in an amount of 30 mol. % to 36 mol. %,
said third component is ethane or ethylene in an amount of 28 mol. % to 35 mol. %, and
said fourth component is n-butane or isobutane in an amount of 22 mol. % to 28 mol. %, or n-pentane or isopentane in an amount of 15 mol. % to 25 mol. %; or
(b) said first component is nitrogen in an amount of 15 mol. % to 25 mol. %,
said second component is methane in an amount of 28 mol. % to 35 mol. %,
said third component is ethane or ethylene in an amount of 23 mol. % to 36 mol. %, and
said fourth component is isobutane in an amount of 21 mol. % to 28 mol. %, isopentane in
an amount of 15 mol. % to 22 mol. %, or propane in an amount of 30 mol. % to 40 mol. %; or (c) said first component is nitrogen in an amount of 10 mol. % to 35 mol. %,
   said second component is methane in an amount of 20 mol. % to 40 mol. %,
   said third component is ethane in an amount of 5 mol. % to 35 mol. %, and
   said fourth component is 1-butene in an amount of 10 mol. % to 35 mol. %; or
(d) said first component is nitrogen in an amount of 18 mol. % to 25 mol. %,
   said second component is methane in an amount of 28 mol. % to 34 mol. %,
   said third component is ethane in an amount of 20 mol. % to 27 mol. %, and
   said fourth component is 1-butene in an amount of 20 mol. % to 28 mol. %, or propane in an amount of 30 mol. % to 40 mol. %.

\* \* \* \* \*